United States Patent
May

[11] Patent Number: 5,901,625
[45] Date of Patent: May 11, 1999

[54] CLOSURE ARRANGEMENT FOR RECLOSABLE BAG

[75] Inventor: Timothy J. May, Greenville, Wis.

[73] Assignee: Reynolds Consumer Products, Inc., Appleton, Wis.

[21] Appl. No.: 08/762,376

[22] Filed: Dec. 9, 1996

Related U.S. Application Data

[62] Division of application No. 08/651,071, May 22, 1996, Pat. No. 5,617,770.

[51] Int. Cl.$^6$ ................................... B23D 25/00
[52] U.S. Cl. ................................ 83/338; 83/670; 83/917
[58] Field of Search ................. 83/338, 337, 669, 83/670, 917, 185, 303, 37, 39; 29/410; 383/63

[56] References Cited

U.S. PATENT DOCUMENTS

| | | | |
|---|---|---|---|
| 1,921,633 | 8/1933 | Nelson | 83/338 X |
| 2,320,651 | 6/1943 | Poux | 29/410 X |
| 3,661,044 | 5/1972 | Duden et al. | 83/100 |
| 3,943,810 | 3/1976 | Muylle | 83/337 |
| 4,073,207 | 2/1978 | Kirkpatrick | 83/659 |
| 4,206,669 | 6/1980 | Fisher et al. | 83/212.1 |
| 4,220,272 | 9/1980 | Danti | 225/2 |
| 4,355,530 | 10/1982 | Chen | 72/452 |
| 4,520,702 | 6/1985 | Davis et al. | 83/337 X |
| 4,962,580 | 10/1990 | Matsuda | 29/410 |
| 5,063,639 | 11/1991 | Boeckmann et al. | 24/30.5 R |
| 5,070,584 | 12/1991 | Dias et al. | 24/587 |
| 5,140,727 | 8/1992 | Dais et al. | 24/587 |
| 5,259,096 | 11/1993 | Grant | 29/453 X |
| 5,307,552 | 5/1994 | Dais et al. | 29/453 |
| 5,403,094 | 4/1995 | Tomic | 383/63 |
| 5,478,228 | 12/1995 | Dais et al. | 83/176 X |
| 5,617,770 | 4/1997 | May | 83/338 X |

*Primary Examiner*—Jack W. Lavinder
*Attorney, Agent, or Firm*—Alan M. Biddison

[57] ABSTRACT

An apparatus is arranged to construct a reclosable zipper attached to a polymeric web. The zipper has a female profile with first and second elongated legs substantially perpendicular to the web and a channel therebetween. The apparatus includes a punch wheel having a first surface for supporting a first portion of the web on a first side of the zipper. The punch wheel includes a plurality of projecting punches for engaging the channel between the first and second legs of the female profile and for exerting a punch force through the first leg to remove slugs from the first leg. The apparatus includes a die wheel adjacent to and coaxially aligned with the punch wheel. The die wheel has a second surface for supporting a second portion of the web on a second side of the zipper and has a plurality of voids for receiving the punches. The punch wheel includes a cam for pushing the punch, and the first and second surfaces are tapered. Each of the punches can have an L-shaped cross section, with a bottom of the L shaped structure engaging the channel.

3 Claims, 5 Drawing Sheets

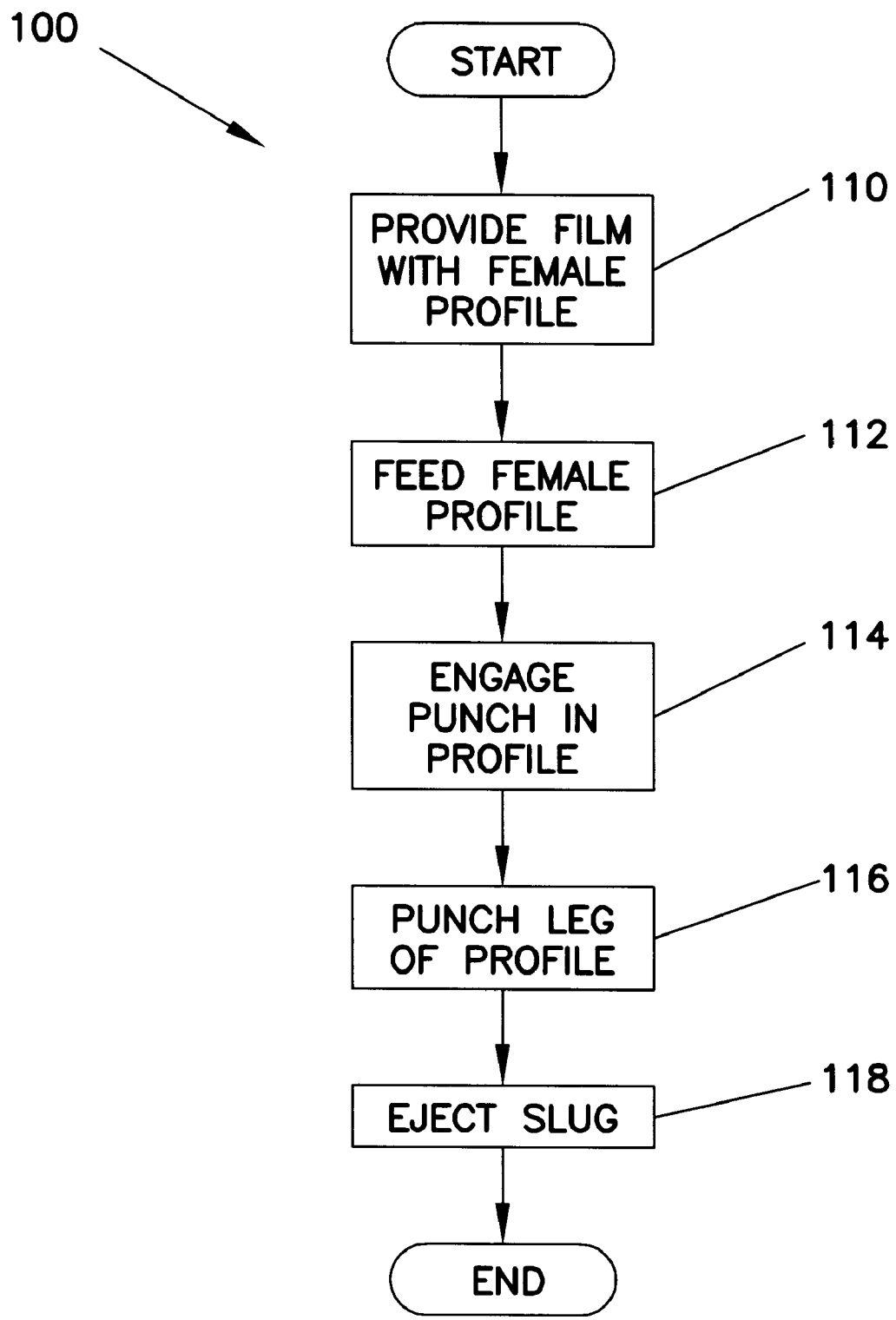

CLOSURE ARRANGEMENT FOR RECLOSABLE BAG

This application is a division of Ser. No. 08/651,071 filed May 22, 1996, now U.S. Pat. No. 5,617,770.

FIELD OF THE INVENTION

The present invention relates to a closure arrangement for a reclosable bag. More particularly, the invention relates to a zipper having male and female profiles.

BACKGROUND OF THE INVENTION

Many consumer packaging applications employ reclosable bags. These bags use reclosable zippers for locking products within the bags. A typical reclosable zipper includes male and female profiles extending along the entire length of the zipper. The male profile typically may be tree-shaped, with an expanded head portion supported by a narrower trunk portion. The female profile is disposed opposite to the male profile and is adapted to mate with the male profile by a pair of legs having locking edges or cornered shoulders. The profiles are interlocked by properly aligning the male and female profiles and pressing them together along the entire length of the zipper. The opposing legs of the female profile slide over the expanded head portion of the male, and lock to it by hooking the head with the cornered shoulders and resting in the trunk portion.

If the bag is holding a grainy or dusty material, conventional zippers can be problematic. Particles of the grain or dust may get caught between the female legs. When this happens, the male profile is often precluded from interlocking between the female legs because of the presence of the particles. As a result, the bag may not be completely sealed.

Consequently, a need exists for a zipper for a reclosable bag which overcomes the aforementioned shortcomings associated with existing zippers.

SUMMARY OF THE INVENTION

The present invention is directed to a zipper for a reclosable bag. The zipper comprises an elongated female profile attached to a first panel section of the bag. The female profile includes first and second legs parallel to each other to form a channel therebetween, and the first leg has a plurality of portions removed to form a series of breaks in the first leg along the length of the bag. The second leg is substantially continuous in dimension along the length of the bag. An elongated male profile is attached to a second panel section of the bag for engaging the channel and interlocking with the first and second legs.

The bag has a mouth, and the second leg can be constructed such that it is positioned closer to the mouth than the first leg. The first and second legs may provide a tactile bumpiness perceptible to touch when engaged with the male profile.

In one embodiment, the first and second panel sections are rectangular and joined together along three edges to result in first and second opposing inside surfaces, and a mouth. The female profile is heat sealed to the first opposing inside surface, and the male profile is heat sealed to the second opposing inside surface. The first and second panel sections, when joined together along three edges, create an enclosed region which may hold a granular product.

In certain implementations, the male profile has a cross-sectional T-shape, and each of the first and second legs of the female profile has a cross-sectional J-shape.

In another aspect, the invention includes a method for constructing a reclosable zipper for a bag. The method includes providing an elongated zipper profile attached to a web and providing first and second opposing legs with a channel therebetween and being arranged substantially perpendicular to the web; feeding the zipper profile into a space between a die wheel and a punch wheel, the punch wheel including a punch, and the die wheel including a void for receiving the punch; engaging the punch into the channel between the first and second legs; and punching the first leg with the punch to remove a slug from the first leg.

In certain implementations, the punch wheel and die wheel are continuously rotated. In a particular implementation, the punch wheel includes a plurality of punches, and the die wheel includes a plurality of voids. Feeding the zipper profile includes continuously feeding the zipper profile into the space between the die wheel and punch wheel. Punching includes continuously punching the first leg with one of the plurality of punches while the die wheel and punch wheel are continuously rotating and while the zipper profile is continuously fed to remove a plurality of slugs from the first leg.

Punching can be implemented by advancing the punch with a cam to push the punch into the first leg.

Engaging can be implemented by orienting the zipper profile so that the punch is engaged in the channel with a cutting surface of the punch positioned against the first leg, while the web is maintained substantially perpendicular to the first leg.

Feeding can be implemented by orienting the zipper profile so that the web is supported by tapered surfaces of the die wheel and punch wheel.

Engaging can be implemented by using a punch with an L-shaped cross section, and positioning a bottom of the L into the channel.

In another implementation of the invention, an apparatus is arranged to construct a reclosable zipper attached to a polymeric web. The zipper has a female profile with first and second elongated legs substantially perpendicular to the web and a channel therebetween. The apparatus includes a punch wheel having a first surface for supporting a first portion of the web on a first side of the zipper. The punch wheel includes a plurality of projecting punches for engaging the channel between the first and second legs of the female profile and for exerting a punch force through the first leg to remove slugs from the first leg. The apparatus includes a die wheel adjacent to and coaxially aligned with the punch wheel. The die wheel has a second surface for supporting a second portion of the web on a second side of the zipper and has a plurality of voids for receiving the punches.

In certain implementations, the punch wheel includes a cam for pushing the punch, and the first and second surfaces are tapered. Each of the punches can have an L-shaped cross section, with a bottom of the L shaped structure engaging the channel.

The above summary of the present invention is not intended to describe each illustrated embodiment, or every implementation, of the present invention. This is the purpose of the figures and the detailed description which follow.

BRIEF DESCRIPTION OF THE DRAWINGS

Other aspects and advantages of the invention will become apparent upon reading the following detailed description and upon reference to the drawings in which:

FIG. 6 is a flowchart of one method for constructing the female profile according to the present invention.

Figure 1:
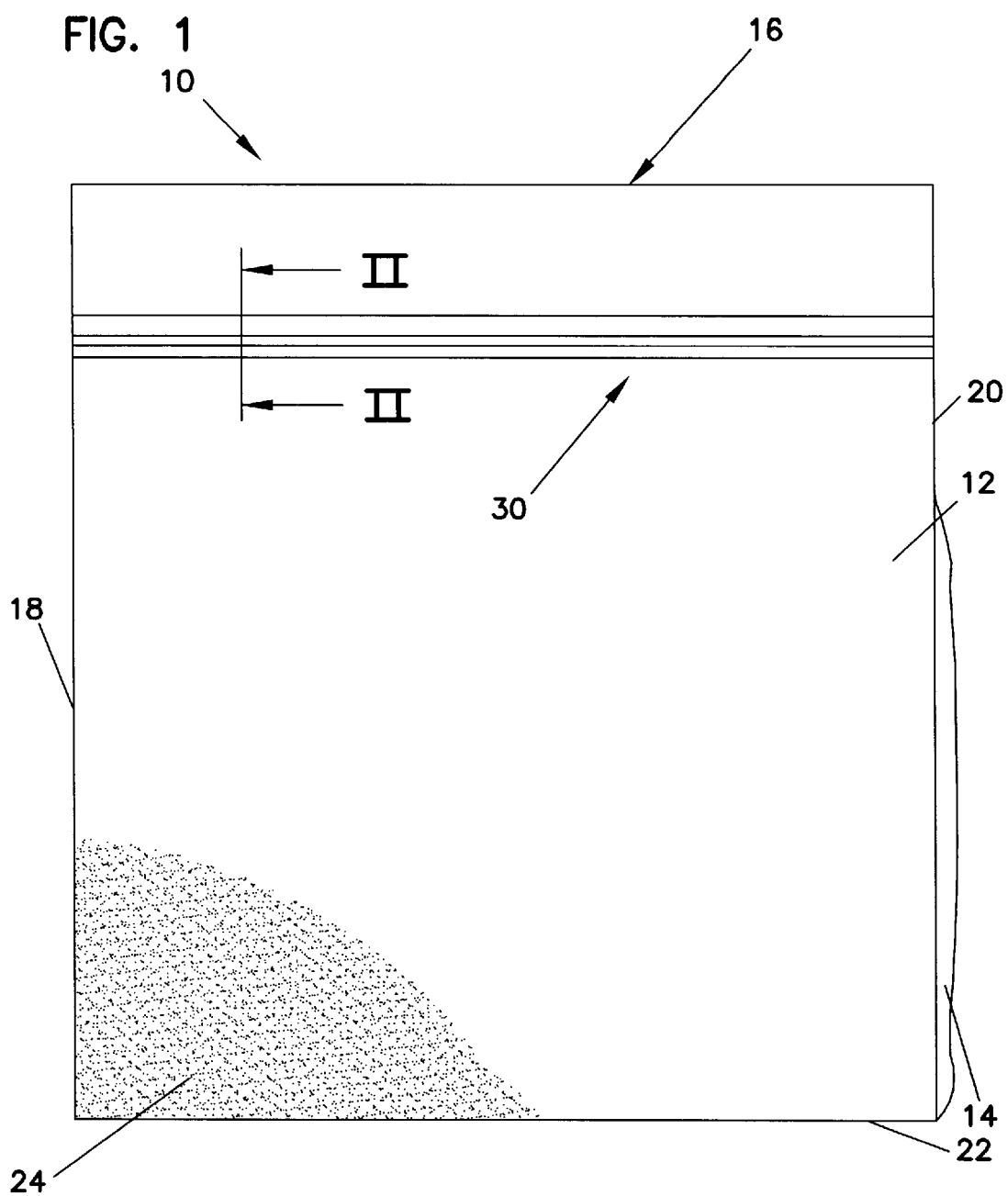
FIG. 1 is a perspective view of a zipper-closable bag embodying the present invention.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DESCRIPTION OF THE ILLUSTRATED EMBODIMENTS

Reclosable flexible packaging arrangements take on a variety of sizes and shapes and are used in a variety of applications. One such arrangement, a reclosable flexible bag, is shown in FIG. 1 generally at 10. Flexible bag 10 is made of first and second opposed panel sections 12, 14 of a polymeric film. First and second panel sections 12, 14 are shown being rectangular in shape and are heat sealed together along at least three edges in order to form a product containment section within the interior of bag 10. Access is provided to the interior of bag 10 through a mouth 16. Mouth 16 is defined by the edges of first and second panel sections 11, 13 open rather than sealed together. Further, the bag need not be rectangular, but can be other shapes and sizes.

Flexible bag 10 includes a pair of side edges 18, 20 and a bottom edge 22. Together side edges 18, 20 and bottom edge 22 define an enclosed portion of flexible bag 10. This enclosed portion may be used to hold a product 24. Product 24 may be a variety of edible food products such as cheese, meat, and crackers, but, as will be explained in more detail below, the arrangement is particularly advantageous to containing a product comprised of or including small grains or powder-like substances. Such products include granulated sugar, powdered sugar, flour, salt, baking soda, sand and other grainy or dusty products.

Flexible bag 10 includes a closure arrangement extending the length from side edge 18 to side edge 20. In the particular embodiment illustrated, the closure arrangement is a zipper illustrated generally at 30. Zipper 30 includes an elongated female profile shown generally at 32 and an elongated male profile shown generally at 34. Female and male profiles 32, 34 cooperate by interlocking in order to allow bag 10 be opened at mouth 16 and reclosed.

Male profile 34 has a cross section which is generally T-shaped including an expanded head portion 36 and a narrower trunk portion 38 (FIG. 2) with flanges 14 extending therefrom.

Figure 2:
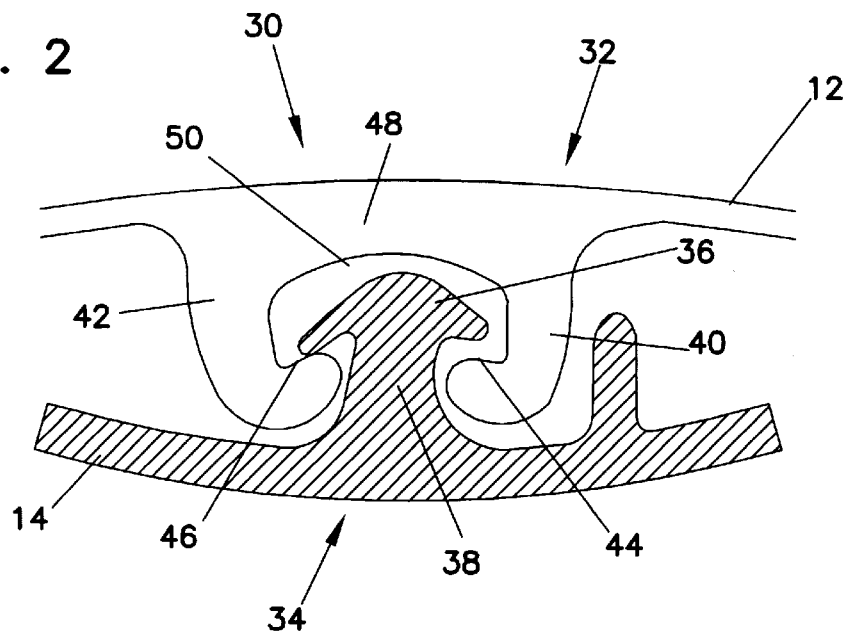
FIG. 2 is a cross-sectional view of the closure arrangement employed in FIG. 1 embodying the present invention.

Female profile 32 includes a locking structure for enclosing and interlocking with male profile. As illustrated in FIG. 2, the locking structure of female profile 32 includes first and second legs 40, 42. First and second legs 40, 42 have a J-shaped cross section and cornered shoulders at 44, 46. Shoulders 44, 46 mechanically engage head 36 of male profile 34 in order to reclose bag 10 at mouth 16. First and second legs 40, 42 are joined by a common base 48, which includes flanges 12 extending therefrom. A channel 50, located between first and second legs 40, 42, functions to contain head 36 of male profile 34. Other male and female profile shapes may be used as well.

Figure 3:
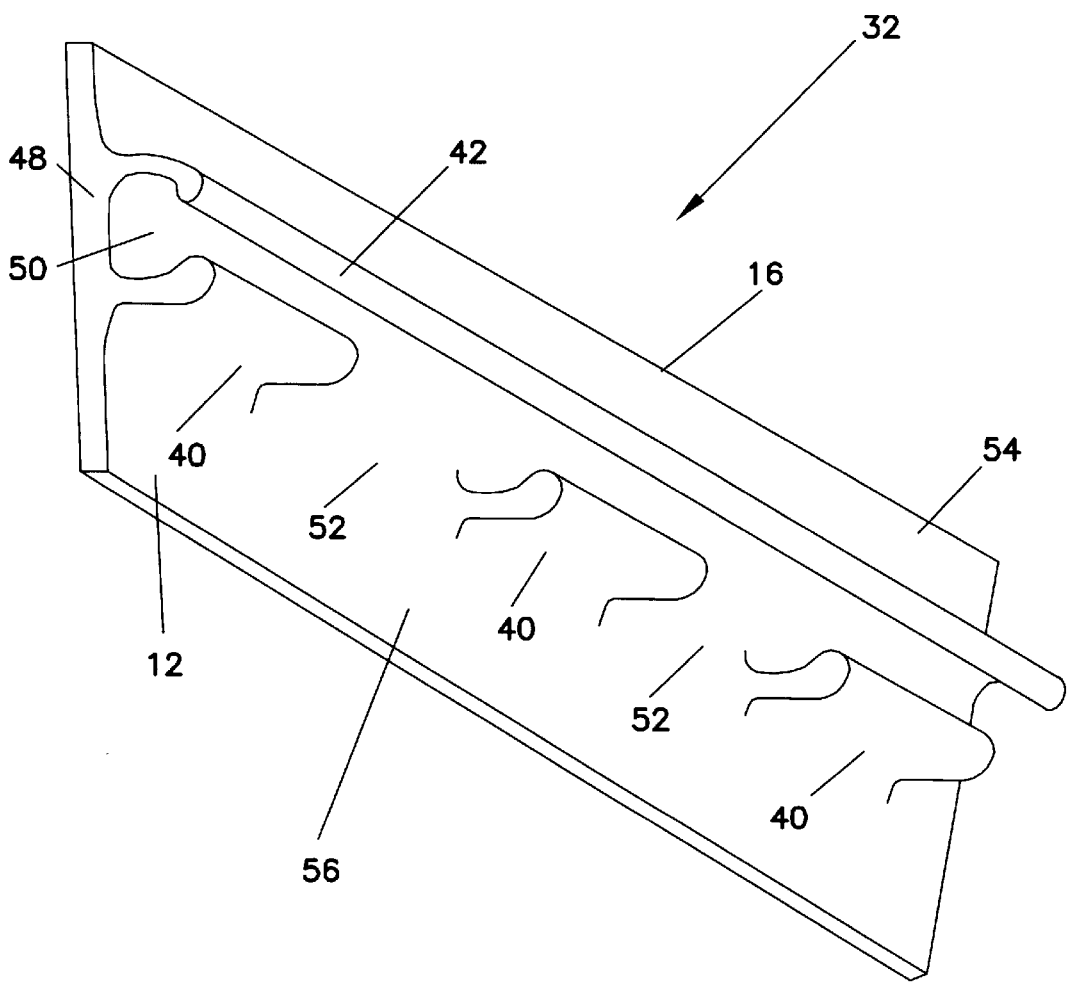
FIG. 3 is a perspective view of a female profile of the closure arrangement embodying the present invention.

Female profile 32 is shown in more detail in FIG. 3. First and second portions 54 and 56, located on opposite sides of the flanges 12, are regions of the polymeric film which generally support female profile 32 and which function as skirts when constructing female profile 32.

First and second legs 40, 42 are parallel to each other and extend across the length of bag 10 from side edge 18 to side edge 20. As illustrated in FIG. 3, first leg 40 has series of gaps or breaks 52 along its length. This is contrasted with second leg 42 which is continuous in dimension along the length of bag 10 and has no breaks. In the embodiment illustrated, second leg 42 is positioned closer to mouth 16 than first leg 40. That is, first leg 40 is positioned closer to bottom edge 22 of bag 10 than first leg 42. The inventor has discovered that by providing breaks in the leg closer to the bottom of the bag, certain advantages are achieved. In particular, when bag 10 is holding a grainy or dusty material, breaks 52 allow the grains or dust particles to fall out of channel 50 through the force of gravity to the bottom of the bag. Without breaks 52, if leg 40 were continuous in dimension along the length similar to second leg 42, substantial amounts of individual grains or dust particles could get trapped or lodged between first and second legs 40, 42. If that occurs, male profile 34 would not be able to interlock between first and second legs 40, 42 where the grainy particles were lodged. Thus, the integrity of the seal would be destroyed. With the gaps 52, however, this problem is avoided because grainy particles are allowed to fall to the bottom of bag 10 through the breaks 52.

When male profile 34 interlocks in female profile 32, a tactile bumpiness results which is perceptible to touch. This tactile bumpiness indicates to a user that the bag is properly reclosed because the zipper can be felt clicking as male profile 34 is engaging female profile 32. As an option, to increase the tactile bumpiness, second leg 42 is also provided with slight gaps or breaks. By providing gaps or breaks in second leg 42 which are substantially small relative to the contained particle size, grainy or dusty material could fall out of zipper 30 if bag 10 were oriented upside down. Further, although providing breaks in both legs decreases the seal strength of the zipper 30, substantially small breaks in the second leg 42, opposite to the legs 40, satisfies the requirements for a strong and secure seal.

Figure 4:
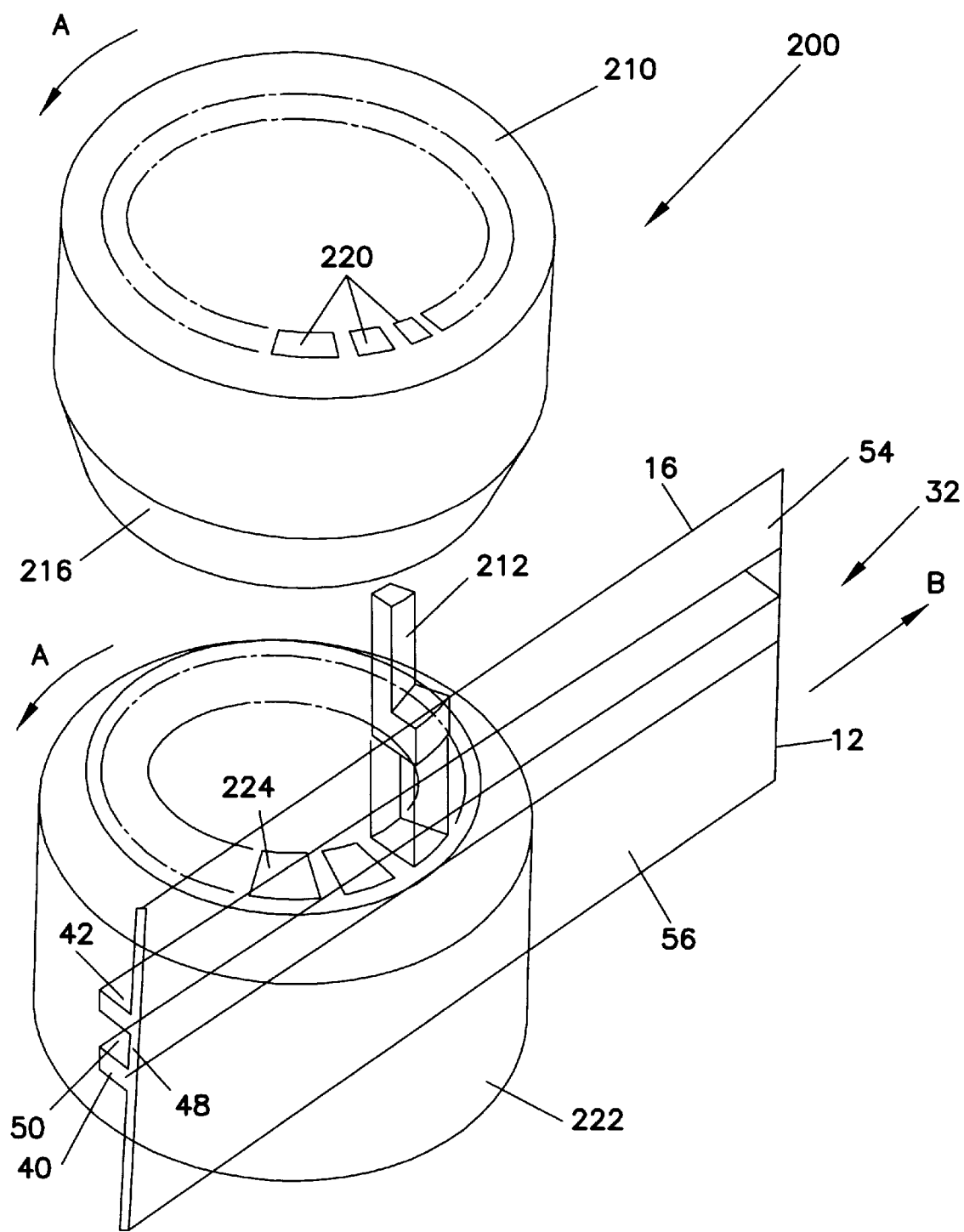
FIG. 4 is a perspective view of an apparatus to construct the female profile of FIG. 3 embodying the present invention.
Figure 5:
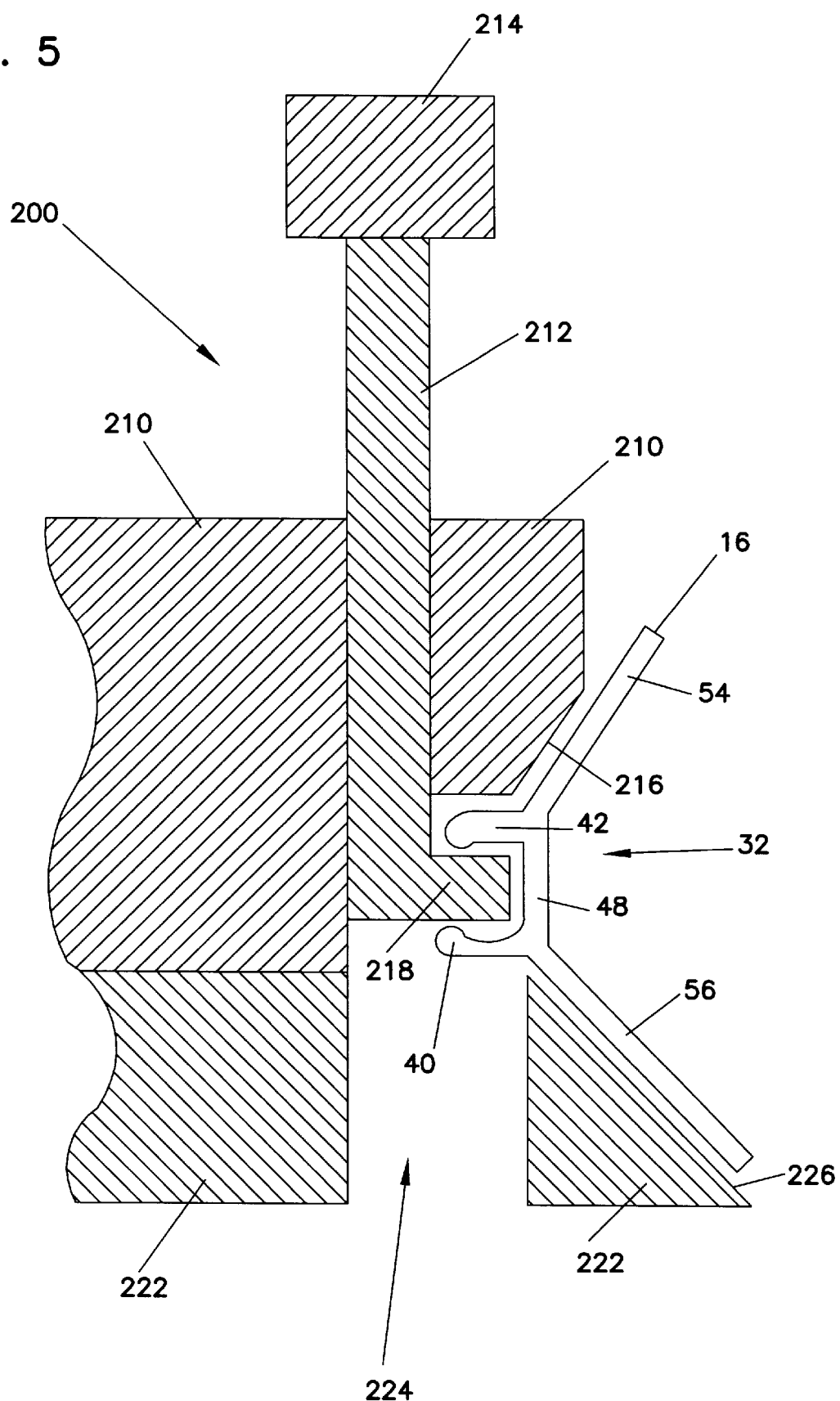
FIG. 5 is a cross-sectional view of the apparatus of FIG. 4 embodying the present invention.

An apparatus and method for constructing the female profile according to the invention is illustrated in FIGS. 4–6. A method for constructing female profile of FIG. 3 is shown in FIG. 6 generally at 100, and an apparatus for constructing the FIG. 3 profile is shown in FIGS. 4 and 5 generally at 200.

In the apparatus for constructing a female profile according to the invention, a generally cylindrical punch wheel 210 with a series of punches 212 is provided. Punch wheel 210 also includes a cam 214 for urging punch 212 in a lateral motion in order to exert a punching force. Punch wheel 210 includes a first tapered surface 216 at an end of punch wheel 210 which is intimately engaged with female profile 32. First tapered surface 216 supports first portion 54 of first panel section 12 and functions to help properly position female profile 32 within the apparatus 200. Punch 212 has an L-shaped cross section, and a bottom portion 218 what includes sharp surfaces for cutting material from first leg 40.

As illustrated in FIG. 5, bottom portion 218 of punch 212 fits between first and second legs 40, 42 to rest intimately within channel 50. Punch 212 is held within slots 220 which border the entire periphery of punch wheel 210. Punch wheel 210 is rotated continuously about a central axis in the direction of arrow A. Punch wheel 210 is conventional, as is known in the art.

A conventional, generally cylindrical die wheel 222 is disposed adjacent to and coaxially aligned with punch wheel 210. Die wheel 222 includes a series of voids 224 concentrically bordering the periphery of die wheel 222 and aligned with punches 212. The function of voids 224 is to receive punches 212 when punches 212 are exerting a punching force through first leg 40. Die wheel 222 includes a second tapered surface 226 for supporting second portion 56 or skirt of first panel section 12. Second tapered surface 226 holds second portion 56 away from the punching force of punch 212 so that it does not get inadvertently caught in the punch 212, and thereby become damaged. Die wheel 222 continuously rotates in the direction of arrow A, simultaneously and synchronously, with punch wheel 210.

By orienting punch wheel and die wheel coaxially and adjacent to one another, the punch is allowed to remove slugs from a leg which is oriented perpendicular to the main web of the polymeric film. This arrangement is advantageous because the female profile is more positively captured by the punch. This enables a more accurate removal of slugs from one of the female legs. The improved accuracy of the punching allows for an improved and tighter seal of the zipper.

A method 100 for constructing the female profile according to the invention is illustrated in FIG. 6. In step 110, a polymeric film with a female profile is provided. As illustrated in FIG. 4, film with female profile includes panel section 12 having first portion 54 on one side of female profile 32 and second portion 56 on the other side of female profile 32. Before the punching operation, female profile 32 has both legs being of a continuous dimension across the length of the film.

In step 112, the female profile is fed into a space between die wheel 222 and punch wheel 210. In operation, female profile 32 would be continuously fed into this space while the punch wheel 210 and die wheel 222 were continuously rotated. Female profile 32 is oriented such that the main web of first panel section 12 is supported by first and second tapered surfaces 216, 226 of punch wheel 210 and die wheel 222. As shown in FIG. 5, first portion 54 is supported by first tapered surface 216, and second portion 56 is supported by second tapered surface 226.

In step 114, punch 212 in engaged into channel 50 between first and second legs 40, 42. Specifically, female profile 32 is oriented so that the bottom portion 218 of L-shaped punch 212 rests within channel 50 and is intimately engaged with first and second legs 40, 42. This occurs while the main web of polymeric film is maintained substantially perpendicular to first and second legs 40, 42.

At step 116, first leg 40 is punched with punch 212 to remove a slug from first leg 40 and to create break 52. In step 118, the slug is ejected, at least in part due to gravity. In order to punch first leg 40, cam 214 (FIG. 5) pushes punch 212 to advance punch 212 into void 224 and thereby remove a slug of material from first leg 40. In operation, punching step 216 operates continuously while female zipper profile 32 is advanced linearly in a direction B and while punch wheel 210 and die wheel 222 continuously rotate.

It will be apparent to those skilled in the art that various modifications and variations can be made to the embodiments illustrated herein without departing from the scope or spirit of the invention. For example, a zipper having a peelable seal that provides a tamper indication can also be used with the embodiments illustrated herein. One example of a peelable seal can be found in U.S. Pat. No. 5,470,156, hereby incorporated by reference. Further, tear strings and notches may also be used with the embodiments illustrated herein. Such modifications and variations do not depart from the true scope and spirit of the invention which is set forth by the following claims.

I claim:

1. An apparatus for constructing a reclosable zipper attached to a polymeric web, the zipper having a female profile with first and second elongated legs substantially perpendicular to the web and a channel between said first and second elongated legs, the apparatus comprising:

a punch wheel having a first surface for supporting a first portion of the web on a first flange of the zipper, said punch wheel having an axis of rotation, the punch wheel including a plurality of L-shaped punches, said L-shaped punches being pushable in a direction parallel to said axis of rotation of said punch wheel, said L-shaped punches having a bottom engageable in the channel between the first and second legs of the female profile such that when one of said L-shaped punches is pushed in direction parallel to said axis of rotation of said punch wheel, slugs are removed from the first leg;

a cam for pushing said punches;

die wheel being adjacent to and coaxially aligned with the punch wheel, the die wheel having a second surface for supporting a second portion of the web on a second flange of the zipper and said die wheel having a plurality of voids aligned with said punches for receiving the punches; and means for rotating said punch wheel and said die wheel coaxially.

2. The apparatus of claim 1, wherein the first surface is tapered.

3. The apparatus of claim 2, wherein the second surface is tapered.

* * * * *